Jan. 3, 1967 K. OLBRICH 3,295,570
PROCESS AND MACHINE-TOOL FOR LONGITUDINAL
AND TRANSVERSE MACHINING
Filed Oct. 23, 1963 4 Sheets-Sheet 1

KURT OLBRICH
INVENTOR.

BY Karl F. Ross

AGENT

Jan. 3, 1967 K. OLBRICH 3,295,570
PROCESS AND MACHINE-TOOL FOR LONGITUDINAL
AND TRANSVERSE MACHINING
Filed Oct. 23, 1963 4 Sheets-Sheet 2
FIG. 6
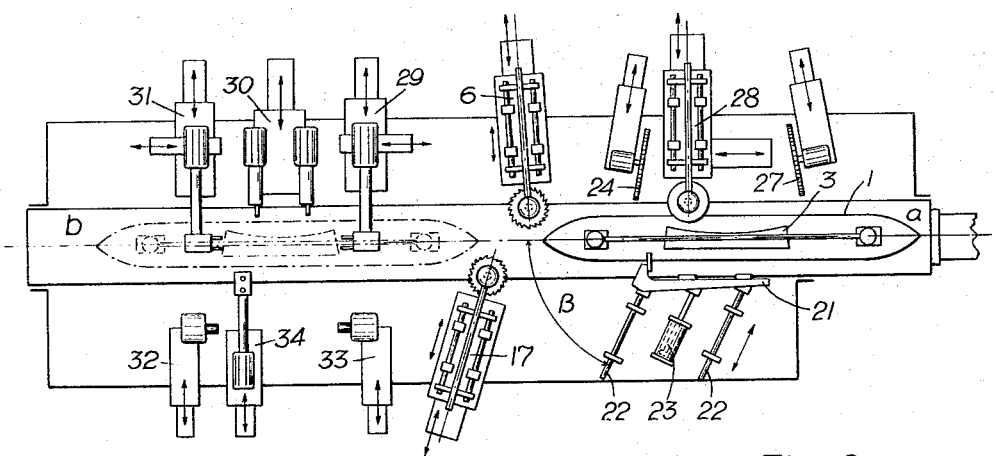
FIG. 7
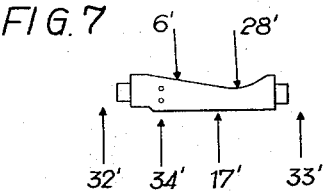
FIG. 9
FIG. 8
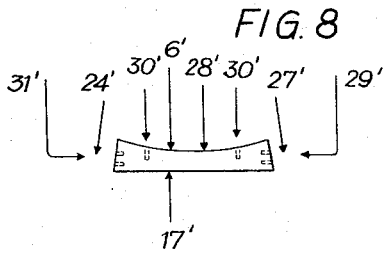
FIG. 10
KURT OLBRICH
*INVENTOR.*
BY Karl F. Ross
AGENT.

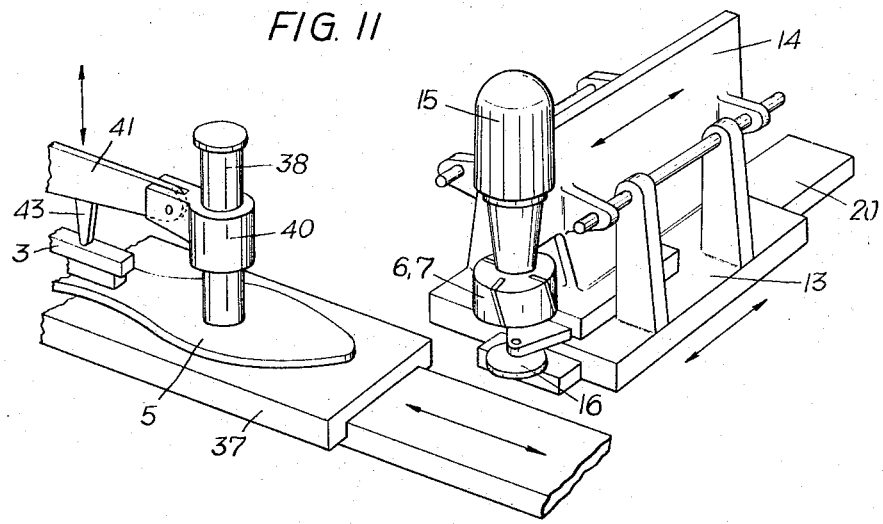
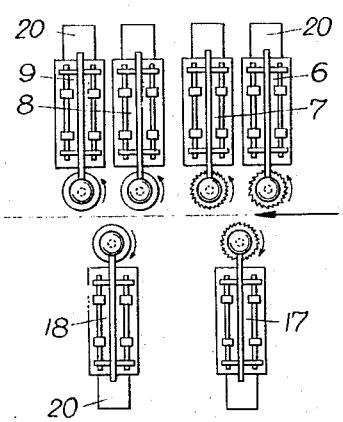
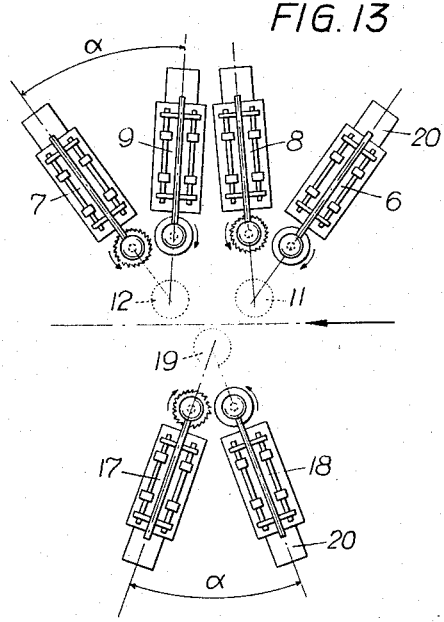

KURT OLBRICH
INVENTOR.

BY
Kurt F. Ross

AGENT

United States Patent Office 3,295,570
Patented Jan. 3, 1967

3,295,570
PROCESS AND MACHINE-TOOL FOR LONGITUDINAL AND TRANSVERSE MACHINING
Kurt Olbrich, Vienna, Austria, assignor to Fa. Maschinenfabrik Zuckermann Komm. Ges. Wien, Vienna, Austria
Filed Oct. 23, 1963, Ser. No. 318,205
Claims priority, application Austria, Oct. 26, 1962, A 8,478/62
7 Claims. (Cl. 144—326)

This invention relates to a process of manufacturing profiled parts, for instance of wood, particularly for seat furniture, with the aid of a double-sided profile milling machine, in which the blank is moved between two template-controlled milling cutters and is machined by the same on two sides at the same time in one operation. The blank is held to the template by a fixing device and is moved from an initial position to a final position by the carriage, which carries the fixing device. The use of such a profile milling machine requires, that each of the subsequent machining operations to which the milled workpiece is to be subjected, including, for instance, longitudinal grinding, drilling or boring, tenon milling and mortising, be carried out as a separate operation on another machine-tool and that the workpiece must be refixed for each of these operations. The repeated fixing and release of a workpiece does not only take considerable time, which delays the production-line movement considerably and involves such a large number of sources of inaccuracy during the machining of a single workpiece that an exact fit of the furniture parts, for instance parts of chairs, is not possible so that the wood tends to burst or the parts are easily separable at the loose joint.

In order to eliminate the above disadvantages involved in the performance of individual operations on different machine-tools for machining a blank, and to enable a time-saving serial production and achieve at the same time extremely accurate dimensions, a new process has been provided, which resides according to the invention in that a fixed blank is subjected in the working path of a double-sided profile milling machine and without change in its fixed position not only to milling but also to grinding in the longitudinal direction on both sides and at different points of the path along which it is advanced and returned is subjected to transverse machining operations, which comprise, e.g. hole drilling or boring, the calking or milling longitudinal slots or cutting transverse grooves, ends or the like, and are carried out by tool units.

The great advantage of such a process resides in a considerable saving of time due to the elimination of the previous fixing and releasing times, and, above all, in the fact, that the relative position of the fixed workpiece remains the same during all machining operations to which it is successively subjected until its completion, so that each completed workpiece agrees in its configuration and recesses with other, similar workpieces with an accuracy, which has not been achieved before. For this reason the workpieces made by the process according to the invention are unique in that they can be perfectly assembled by a machine because all components have perfectly machined fitting surfaces.

The process according to the invention may be modified in dependence on the requirements determined by the shape of the workpiece to be manufactured and its joint-forming portions.

For instance, the transverse machining, may be carried out before or during or after the profile milling or longitudinal machining. This enables the performance of operations such as drilling, or calking a workpiece or cutting it to length between the individual longitudinal machining operations to which the workpiece is subjected.

The profile milling and profile grinding may be carried out in successive phases, in which the workpiece or the tools may be fed in the same or opposite directions, and these phases may immediately succeed each other or may be interrupted for a transverse machining operation. In this case it will be desirable to carry out the various transverse machining operations on the workpiece outside the feeding range for the longitudinal machining.

When it is necessary to roughmill the blank before its longitudinal machining, the blank may be subjected to a milling pass by means of a template-controlled, longitudinal milling cutter while the blank is still in its initial position.

It is also possible within the scope of the invention to keep the workpiece or blank with its fixing device stationary and to move the tools for the longitudinal machining just as the tools for the transverse operation relative to the blank individually or in groups. In all modes of carrying out the process described hereinbefore, a transverse machining operation my be carried out during the time for which a longitudinal machining operation is interrupted.

The process according to the invention is carried out with a double-sided profile milling machine, which comprises two longitudinal carriages each carrying a rotating milling cutter, and a fixing device for the blank to be machined on both sides at the same time and for the template serving for controlling the tools.

For carrying out the process described hereinbefore, a profile milling machine of this type comprises on both sides of the path of movement of the fixing device the two milling units and additional milling units and grinding or chamfering units for longitudinal machining and a plurality of tool units for transverse machining and said tool units can be automatically brought into action individually or in groups by means of a mechanical, electrical, pneumatic or hydraulic control. Such a profile milling machine enables furniture parts of all kinds to be made in two operations and with a high dimensional accuracy from a blank to a workpiece ready for assembly.

Further features of the profile milling machine according to the invention will be described hereinafter with reference to the drawing, in which a number of embodiments are diagrammatically shown by way of example.

FIG. 6 is a diagrammatic top-plan view showing a second embodiment of the profile milling machine.

FIGS. 7 and 8 show two different furniture parts which may be manufactured on this machine.

FIGS. 9 and 10 show the blanks required for this purpose.

FIG. 11 is a perspective view showing by way of example a tool unit.

FIG. 12 and 13 show two embodiments of milling and grinding units for the longitudinal machining of a blank.

Figure 1:
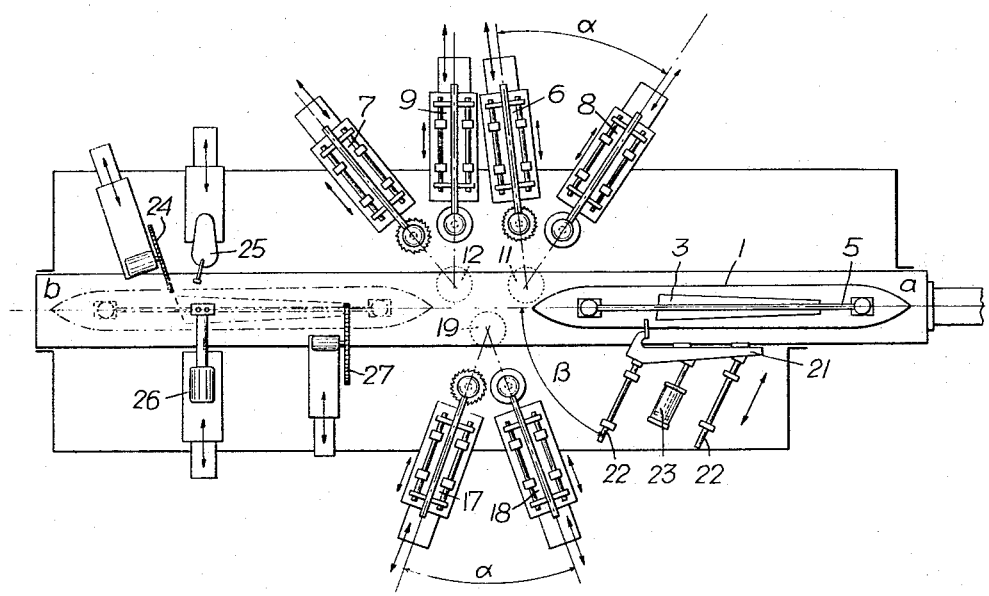
FIG. 1 is a diagrammatic top-plan view showing the arrangement of the tool units relative to the end positions of the fixing device.

In the double-sided profile milling machine diagrammatically shown in FIG. 1, a workpiece carriage 1 comprising a fixing device and the template 5 for the blank 3 is shown with solid lines in an initial position $a$ and with dot-dash lines in an intermediate or final position $b$. This showing indicates also the entire path of movement of the workpiece carriage 1. The workpiece carriage 1 has a predetermined length, which depends on the length of the fixing device. The latter holds the wooden blank 3 on the workpiece carriage 1 in such manner that the blank is spaced above the template 5. The space between the workpiece carriage 1 in its two positions $a$ and $b$ is used for the longitudinal machining of the blank 3. For the longitudinal machining of the blank, for instance, on one side to be machined, the double-sided profile milling machine has two milling units 6, 7 and two grinding units 8, 9. These units are combined in pairs in such a manner that a milling unit 6 or 7 and a grinding unit 8 or 9 include an acute angle and their tools may be alternately caused to act on the blank at one and the same station. Their carriages guides are aligned to cause the tools to act at the same station 11 or 12. One of these tool units 6, 7, 8, 9 is shown in perspective in FIG. 11 and carries on its carriage 13 a slide member 14, which is longitudinally movable in the same direction as the carriage and carries the electric motor 15 as well as the milling or grinding tool 6 or 7 and in an axial position relative to the tool the follower roller 16, which is urged against the template 5 under the action of a spring or a pneumatic cylinder, not shown, to guide the tool while it is machining the blank 3. On the opposite side on which the blank 3 is to be machined, only a single pair of tool units 17, 18, consisting of a milling unit and a grinding unit, may be arranged. These units have also a common working station 19 and are disposed at an acute angle relative to said station and can be alternatively caused to act at said station when the carriage 13 is advanced or retracted along the guides 20.

As is shown in FIG. 12, the various tool units for longitudinal machining may be arranged adjacent to the path of the movement of the workpiece carrier 1 wherever there is sufficient space between the initial position $a$ and the final position $b$. The slides 14 may be arranged in parallel. It is possible to perform profile milling and pregrinding in close succession during the first movement of the workpiece 3 past the tool units whereas the finish grinding may be performed during the return movement of the workpiece to the initial position $a$.

When the workpiece carriage 1 is in its initial position, it is engaged on one side by a centering or aligning device having a stop bar 21, which forms a stop angle for the blank 5 to enable the same to be aligned in two mutually perpendicular directions in the fixing plane. This stop bar 21 is held by guides 22, which include an acute angle $\beta$ with the path of movement of the workpiece carriage 1 to enable an adjustment of the bar only in the direction of one limb. The stop bar 21 is held by a pneumatic or hydraulic driver 23 and is advanced and retracted by the same into and from the engaging position.

In the embodiment shown in FIG. 1, the tools for the transverse machining of the blank 3 include on one side to be machined a circular saw 24 and a calking unit 25 and on the other side a drilling unit 26 and a circular saw 27. All transverse machining units 24 to 27 are disposed adjacent to the workpiece carriage 1 when the same is in its final or intermediate position $b$ so that they succeed one part of the tool units for the longitudinal machining in the sequence of operations and precede another part of the tools for longitudinal machining, such as the grinding members 8, 9 in the sequence of operations. By means of electrical, pneumatic, or hydraulic controls, known per se, all these tool units may be caused to act, controlled and retracted at the proper time.

Figure 2:
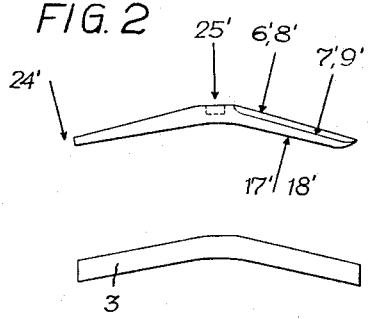
FIGS. 2 and 3 show two different furniture parts and FIGS. 4 and 5 the corresponding blanks.
Figure 4:
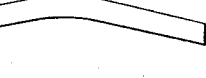
Figure 3:
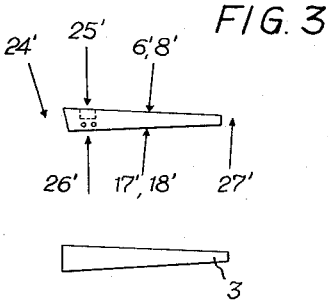
Figure 5:
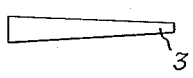

Such a double-sided profile milling machine is suitable, for instance, to make the chair parts shown in FIGS. 2 and 3 from the pre-cut blanks 3 shown in FIGS. 4 and 5. The cycle of operations is performed as follows: The blank 3 shown in FIG. 4 or FIG. 5 is inserted into the fixing device of the workpiece carriage 1 and temporarily held by the centering device 21 in the proper position for fixing. For its longitudinal machining, the blank 3 is moved by the workpiece carriage 1 along a straight line between the milling tools of the milling units 6, 7, 17 disposed on both sides. During this movement the blank is machined on both longitudinal sides according to the profile of the template 5. When the workpiece carriage 1 has reached the position $b$ indicated with dash-and-dot lines in FIG. 1, the carriage remains in this position for a transverse machining. The tool units 24–27 for drilling, calking and sawing are then caused to act simultaneously or in succession on the blank. When the transverse machining has been performed, the workpiece carriage 1 returns to its initial position $a$ and may be ground during this return movement by the grinding units 8, 9 or 18 of the tools for longitudinal machining when such units are advanced to the working position 11, 12 and 19 instead of the milling units 6, 7, 17. Hence, the profile milling machine is not only suitable for milling a blank 3 on two longitudinal sides in an uninterrupted operation but also for finishing it with grinding means and subjecting it to transverse machining so that the need for performing operations on additional machines is eliminated and the operation can be performed within a much shorter, economically tolerable time. The arrows 6', 7', 17' and 24', 25', 27' in FIGS. 2 and 3 indicate the action of the various tool units.

In the embodiment of the double-sided profile milling machine shown in FIG. 6, the tool units for transverse machining are disposed adjacent to the workpiece carriage 1 when it is in its initial position $a$ and in its position $b$. When the workpiece carriage 1 is in its initial position $a$, the centering device 21 for the blank 3 to be fixed is disposed on one side of the carriage and the two circular saw units 24 and 27 for cutting the blank to length are disposed on the other side. An additional tool unit 28 disposed between the units 24 and 27 has a rough milling cutter movable along the template 5 and the blank. When the blank is stationary, this rough milling cutter 28 is caused to act on those areas in which a greater depth of cutting is required for the milling cutter where curved surfaces are to be shaped. In this case the transverse machining and the rough milling will preferably be performed in closely succeeding steps. The rough milling and sawing are succeeded by the longitudinal machining of the blank 3 performed by the tool units 6, 17 while the blank is moved from position $a$ to position $b$, indicated with dash-and-dot lines. A plurality of tool units for transverse machining are disposed adjacent the blank in position $b$. These comprise three different drilling units 29, 30 and 31 on one side to be machined and two tool units 32, 33 for tenon milling and a tool unit 34 for boring holes on the opposite side. Only one milling unit 6 or 17 for the longitudinal machining of the blank is provided on each side to be machined. Because all tool units 29–31 and 32–34 associated with position $b$ may be used at the same time, the transverse machining of the blank 3 to form, for example a chair part as shown in FIG. 7 or FIG. 8, is effected within a relatively short time, which is a fraction of the sum of the times required for each transverse machining operation. The different steps are indicated in FIGS. 7 and 8 by arrows having the same reference numerals as the tool units.

Figure 14:
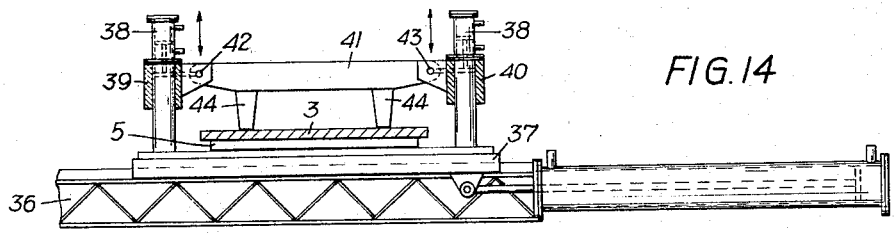
FIGS. 14 and 15 show two embodiments of the fixing device for the blank.
Figure 15:
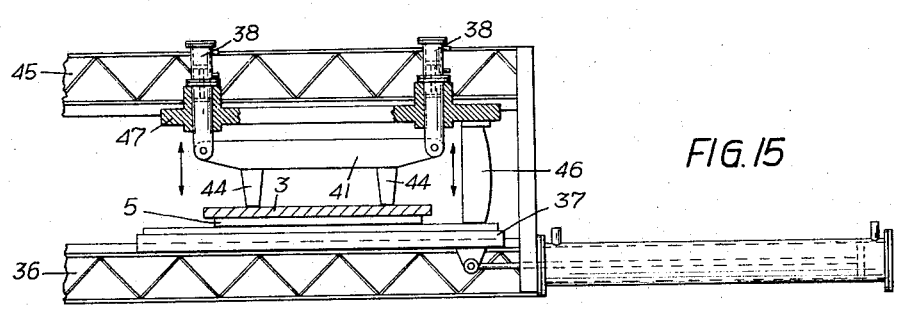

In all embodiments of the double-sided profile milling machine which have been described hereinbefore, it is desirable to use the fixing device shown in FIG. 14. The same has a carriage 37, which carries two upright guide cylinders 38, which are spaced apart by a distance corresponding to the length of the longest workpiece to be machined. Each guide cylinder 38 carries a sleeve 39 or 40, which is slidable and can be fixed in position. Both sleeves 39, 40 are connected by a pressure beam 41, which is suitably pivoted to the sleeves by joints 42, 43 and has two pressure fingers 44 or the like for holding down the workpiece or blank 3 onto the underlying template 5. If a longitudinal machining of the blank at high speed is desired, a second stationary guide bed 45 is provided, which is spaced above and parallel to the lower guide bed 36. Just as the base carriage 37 slides in the lower bed 36, a base carriage 47 having the same size as the carriage 37 and rigidly connected to it by the post 46 is slidably incorporated in the upper bed 45 and carries the two guide cylinders 38. The pressure beam 41 is again pivoted to the two sleeves 39, 40, which are slidable on and can be fixed to the guide cylinders 38. The guide cylinders 38 are fixed only to the upper carriage 47. The pressure fingers 44 of the pressure beam 41 hold the blank 3 onto the template 5. During the longitudinal machining of the blank 3, both carriages 37, 47 slide forwardly in their guide beds 36, 45 according to the feeding velocity.

Figure 16:
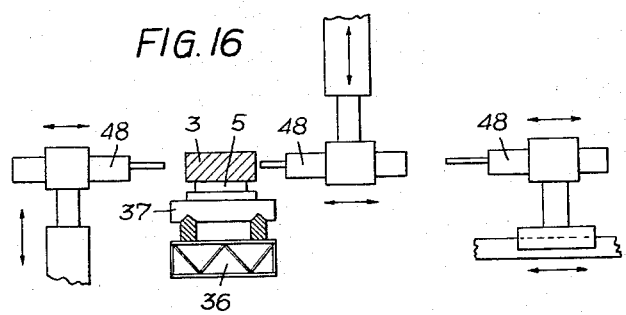
FIG. 16 shows an arrangement of a measuring feeler.
Figure 18:
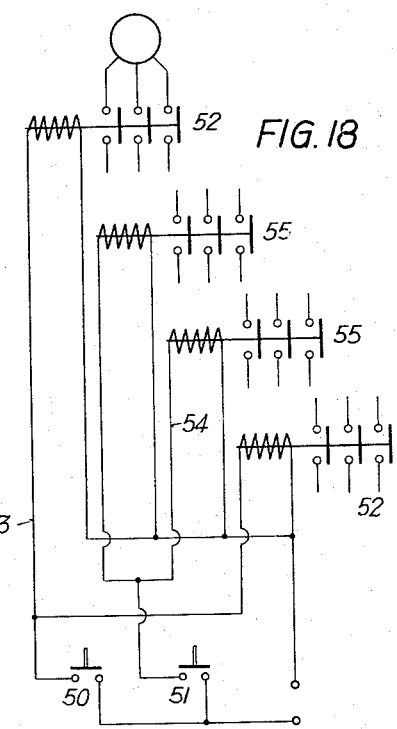
FIGS. 17 and 18 show the essential features of the electric blocking arrangement for the centering and fixing mechanisms.
Figure 17:
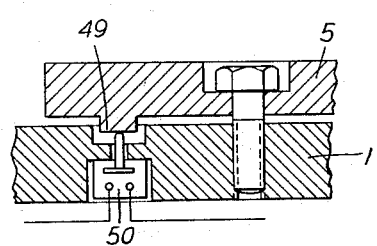

A uniform machining of the workpieces requires a check. For this purpose at least one measuring feeler 48 is provided at each of those points of the path of movement of the workpiece carriage 1 at which this carriage is in its final or intermediate position b. The design of the measuring feeler 48 and its electric indicating device or its automatic releasing device is known per se (see U.S. Patent No. 2,315,548) and for this reason is not explained here. Within the scope of the invention, however, a measuring feeler 48 is disposed according to FIG. 16 on both sides on which the blank 3 is to be machined. This feeler is moved from below or above or from the side into the plane of the blank. The measuring feeler is then urged against the machined surface to check its accuracy in dimensions and form. A few of these measuring feelers may be employed to check the final form of all surfaces of a workpiece.

Because a plurality of different tool units are employed in the double-sided profile milling machine, these tool units must be brought into action and withdrawn from the working station in accordance with the working program to be performed. It is essential to prevent the template 5 connected to the blank 3 or other control means from imparting control movements to the tool units at an improper time, which would cause the units to act on a wrong portion of the blank and might result in defects of the workpieces or damage to the machine.

For this reason the invention provides an electric interlocking system for all tool units of the profile milling machine, which system is based on the idea of providing the pressure beam or another replaceable part of the fixing device, for instance the template 5, with a cam 49 having a predetermined characteristic, which is due to its shape or relative position. This cam 49 closes one of a plurality of switch contacts, such as 50 and 51, of an electrical interlocking system, when the template 5 is placed on the workpiece carriage 1 or when a pressure beam 41 is connected to the sleeves 39, 40. The closing of this switch contact causes a contactor 52 or 55 of a working circuit to energize the same. The interlocking system includes a plurality of interlocking control circuits 53, 54 including a switch contact 50, which may be releasable, e.g. by the template 5, and a plurality of contactors 52. By the action of predetermined contactors, the tool units included in the working circuit are energized and held ready for operation. The other tool units belonging to a working circuit controlled by another contactor remain entirely de-energized and in their retracted position.

I claim:
1. A method of operating a double-side copying miller having a multiplicity of machining stations spaced along and on opposite sides of a longitudinal transport path for an elongated workpiece, comprising the steps of clamping said workpiece on a carriage provided with a machining template having contoured longitudinal sides extending along said path for determining the machined configuration of said workpiece; feeding a pair of milling cutters toward said workpiece and guiding said cutters by engagement with said template while displacing said carriage along said transport path for milling a contour corresponding to that of said template in said workpiece; thereafter without releasing said workpiece from said carriage displacing a pair of grinding elements from opposite sides of said path into engagement with said workpiece and guiding said grinding elements by engagement with said template while continuing the displacement of said carriage along said path to finish-machine the contours of the workpiece in accordance with the configuration of said template; immobilizing said carriage at at least one location along said transport path and displacing a tool transversely to said path into engagement with the workpiece while said carriage is immobilized to transversely machine said workpiece; and displacing a saw blade transversely of said workpiece across said path and through said workpiece for trimming said workpiece to a predetermined length.

2. The method defined in claim 1, wherein said carriage is reciprocated along said transport path and is milled and subsequently ground at the identical location along said path on each side thereof.

3. A double-sided copying milling machine, comprising support means defining a linearly extending transport path for a workpiece to be milled; at least one carriage displaceable along said transport path; said carriage being provided with a support surface for an elongated template having contoured longitudinal sides of a configuration corresponding to that of the machined workpiece, a template mounted upon said surface, and clamping means for releasably fixing a longitudinally extended workpiece blank onto said template and said carriage, thereby clamping said template onto said carriage; at least one milling station disposed on each side of said transport path and provided with a respective miller head having follower means thereon displaceable transversely of said path into engagement with said blank and the contoured sides of said template, respectively, for machining said blank to contours corresponding to those of said template as said template and said blank are shifted on said carriage past said milling stations; at least one grinding station on each side of said path having a respective grinding head with follower means thereon displaceable transversely of said path in the direction of said blank and engageable therewith and with said template, respectively, for finish-machining of said blank to the contours of said template upon relative displacement of said carriage and said grinding stations subsequently to the milling of the contours of said blank; and at least one transverse-machining station along said path including retaining means for temporarily immobilizing said carriage, and a transverse-machining head displaceable transversely of said transport path into engagement with said blank for machining same; and at least one sawing head displaceable transversely to said path for trimming said blank on said carriage to a predetermined length.

4. A machine as defined in claim 3 wherein said transverse-machining head is provided with a plurality of machining tools including at least one recessing tool adapted to form a recess in said blank.

5. A machine as defined in claim 4 wherein each of said heads is provided with a respective source of modified power for driving the respective tool.

6. A machine as defined in claim 3 wherein the milling head and the grinding head at the milling station and the grinding station on each side of said machine are positioned so as to dispose the respective tool at the identical machining locations on the respective sides of said path.

7. A machine as defined in claim 3 wherein said carriage is movable along said path between two extreme positions, said support means being provided with a detachable aligning member engageable with said blank to align said blank with said transport path when said carriage is in one of said extreme positions.

References Cited by the Examiner

UNITED STATES PATENTS

| | | | |
|---|---|---|---|
| 142,034 | 8/1873 | McNeile | 144—144 |
| 215,767 | 5/1879 | Parker | 144—154 |
| 1,727,513 | 9/1929 | Maloon | 144—154 |
| 1,835,528 | 12/1931 | Roe | 144—154 |
| 2,045,390 | 6/1936 | Howe | 144—154 |
| 2,315,548 | 4/1943 | Schoenky | 144—3 |
| 2,918,951 | 12/1959 | Hausmann | 144—3.1 |

FOREIGN PATENTS 569,822  11/1957  Italy.

HAROLD D. WHITEHEAD, *Primary Examiner.*

UNITED STATES PATENT OFFICE
CERTIFICATE OF CORRECTION

Patent No. 3,295,570          Dated January 3, 1967

Inventor(s) Kurt OLBRICH

It is certified that error appears in the above-identified patent and that said Letters Patent are hereby corrected as shown below:

Column 6, line 25, between "and" and "is" read:

-- said workpiece -- .

Signed and sealed this 6th day of February 1973.

(SEAL)
Attest:

EDWARD M. FLETCHER, JR.
Attesting Officer

ROBERT GOTTSCHALK
Commissioner of Patents